(12) United States Patent
Harrison (10) Patent No.: US 7,492,810 B2
(45) Date of Patent: Feb. 17, 2009

(54) METHOD AND APPARATUS FOR SEGMENTED CODE CORRELATION

(75) Inventor: Daniel D. Harrison, Delanson, NY (US)

(73) Assignee: General Electric Company, Schenectady, NY (US)

(*) Notice: Subject to any disclaimer, the term of this patent is extended or adjusted under 35 U.S.C. 154(b) by 629 days.

(21) Appl. No.: 11/097,294

(22) Filed: Apr. 4, 2005

(65) Prior Publication Data

US 2006/0222113 A1    Oct. 5, 2006

(51) Int. Cl.
*H04B 1/00* (2006.01)
(52) U.S. Cl. ............... 375/150; 375/140; 375/142; 375/145; 375/147; 375/149; 375/152; 375/316; 375/343; 375/367; 342/352; 342/357.05; 342/378; 342/402; 342/417; 708/422
(58) Field of Classification Search ........... 375/208, 375/209, 210, 343, 150, 367, 142, 145, 149; 708/422
See application file for complete search history.

(56) References Cited

U.S. PATENT DOCUMENTS

| | | | |
|---|---|---|---|
| 4,012,598 A * | 3/1977 | Wiley | 375/371 |
| 4,691,326 A * | 9/1987 | Tsuchiya | 375/152 |
| 5,473,615 A * | 12/1995 | Boyer et al. | 714/704 |
| 5,646,962 A | 7/1997 | Harrison | |
| 5,682,139 A | 10/1997 | Pradeep et al. | |
| 5,737,356 A | 4/1998 | Harrison et al. | |
| 5,752,218 A | 5/1998 | Harrison et al. | |
| 5,848,026 A * | 12/1998 | Ramamurthy et al. | 365/238.5 |
| 5,896,304 A | 4/1999 | Tiemann et al. | |
| 5,977,909 A | 11/1999 | Harrison et al. | |
| 5,982,811 A | 11/1999 | Harrison et al. | |
| 5,987,059 A | 11/1999 | Harrison et al. | |
| 6,028,883 A | 2/2000 | Tiemann et al. | |
| 6,028,887 A | 2/2000 | Harrison et al. | |
| 6,104,978 A | 8/2000 | Harrison et al. | |
| 6,118,808 A | 9/2000 | Tiemann et al. | |
| 6,151,353 A * | 11/2000 | Harrison et al. | 375/136 |
| 6,292,748 B1 | 9/2001 | Harrison | |
| 6,298,229 B1 | 10/2001 | Tomlinson, Jr. et al. | |
| 6,324,213 B1 | 11/2001 | Harrison | |
| 6,366,231 B1 | 4/2002 | Rao et al. | |
| 6,438,182 B1 | 8/2002 | Olaker et al. | |
| 6,493,376 B1 * | 12/2002 | Harms et al. | 375/130 |
| 7,058,378 B2 * | 6/2006 | Grieco et al. | 455/255 |
| 2003/0201935 A1 * | 10/2003 | King et al. | 342/357.15 |
| 2004/0059976 A1 * | 3/2004 | Maeno | 714/738 |

* cited by examiner

*Primary Examiner*—Chieh M Fan
*Assistant Examiner*—Siu M Lee
(74) *Attorney, Agent, or Firm*—Duane Morris LLP (57) ABSTRACT

A method and an apparatus is disclosed for efficient cross correlation of a plurality of signal vectors. Incoming data is partitioned into several segments and processed according to an algorithm where data rotation is a function of post-correlation memory size.

54 Claims, 8 Drawing Sheets

METHOD AND APPARATUS FOR SEGMENTED CODE CORRELATION

BACKGROUND

GPS Satellite signals are transmitted using direct sequence spread spectrum ("DSSS") signaling that spreads the transmitted data across a bandwidth much larger than the original data bandwidth. In binary DSSS communication, a wideband carrier is generated by bi-phase modulation of a single frequency carrier using a binary pseudo-random noise sequence (the "P/N code"). For example, the generated P/N code is applied to a balanced modulator whose other input signal is a single-frequency (narrow-band) carrier. The modulator output is then the wide-band carrier. To communicate data, the wide-band carrier is bi-phase modulated by a binary message data stream. The message data rate is usually much lower than the P/N-code symbol or "chip" rate, and the data and code-chip edges are usually synchronized.

At the receiver, a DSSS signal is processed by mixing the received signal with a locally-generated narrow-band carrier in order to shift the wideband signal center frequency down to "base-band" (0 Hz). If the frequency (and phase) of the local carrier matches that of the received signal (when there is no data or P/N code modulation), then the mixer output signal will be the wide-band data stream that is the product of the P/N code and the message-data sequence. The P/N code is then removed by multiplying the wide-band data stream with a locally-generated replica of the P/N code that is time aligned with the received P/N code. This multiplication is the so-called "data de-spreading process" and yields the original message data. More importantly, the relative alignment of the P/N codes received from different satellites indicates the position of the receiver on the surface of the earth.

A difficult task associated with the de-spreading process is aligning the carrier replica with proper carrier frequency and phase as well as generating the P/N code replica at the proper rate and with proper time alignment ("code offset"). In many DSSS communication systems, the necessary carrier frequency, carrier phase, and P/N code offset are not known a priori at the receiver and these parameters are determined by trying different values from a finite set until a large signal is observed at the data-filter output. A DSSS signal is said to be acquired when the proper frequency, phase and code offset have been determined.

In GPS communication, each satellite transmits a single high-resolution DSSS signal on frequency L2 and the same signal plus another lower-resolution DSSS signal on frequency L1. The low and high-resolution codes are known as the course/acquisition ("C/A") and precise ("P") codes, respectively. The high resolution service is typically reserved for military use while the low-resolution service is unrestricted. The low-resolution DSSS signal comprises a P/N code with a 1.023 MHz chipping rate, a 1.0 ms repetition period and a message data sequence (the NAV data) with a rate of 50 bits per second. Since the C/A code repeats every 1.0 ms, there can be 1023 different code offsets to search (2046 if the search is performed in half-chip steps).

The received satellite signal frequency includes a typically substantial Doppler shift as the result of the satellite's velocity in orbit. The Doppler shift may be as large as ±7.5 kHz and must be accounted for successful signal acquisition. The Doppler frequency identification can be done by searching the expected frequency range for each satellite. For example, a ±7.5 kHz frequency range can be searched with thirty 500 Hz steps by repeatedly cross-correlating the received signal with the locally-generated P/N sequence for different carrier frequencies. Thus, GPS acquisition entails cross correlation of the satellite code, code offset and Doppler frequency.

Near the earth's surface, the received wideband satellite signals are very weak and are buried in noise. However, after correct de-spreading (i.e., multiplication by the correct P/N code and Doppler replica), the de-spread signal bandwidth is reduced to just the message-data bandwidth. Receiver noise is then reduced by integrating the de-spread signal over some portion of the message bit period. It is only after the noise has been reduced that one can detect the signal presence and thus determine whether the signal has been properly de-spread. This means that the de-spreading and acquisition process is a search over replica code (satellite ID) and code phase, and over replica carrier frequency and phase. Because there are many possible codes, code phases, and Doppler shifts, the de-spreading and acquisition search can be take much time and energy.

SUMMARY OF THE DISCLOSURE

To reduce the time and energy needed to acquire GPS satellite signals, a segmented code-phase correlator architecture has been developed and is disclosed herein. In one embodiment, the disclosure relates to a parallel correlator having a data memory having a sample-sequential input and a sample-parallel output, said data memory organizing the sample-sequential input into blocks of n sequential samples and providing one of said blocks to said sample-parallel output; a code register organized for a sample-serial or a segment-serial input and a sample-parallel output, said sample parallel output having n parallel samples, the segmented code register configured to register the input samples in their order of input and to one of forward-shift or backward-shift the registered samples on each clock cycle prior to parallel output, said forward-shift shifting the registered samples by one sample position and the backward-shift shifting the registered samples by one segment of samples; and an inner product calculator having at least two sample-parallel inputs, each of said sample-parallel inputs having n parallel samples, said inner product calculator having one output representing the inner product of the two sample-parallel inputs.

In another embodiment, the disclosure relates to a parallel correlator comprising a data memory having a sample-sequential input and a sample-parallel output, said data memory organizing the sample-sequential input into blocks of n sequential samples and providing one of said blocks to said sample-parallel output; a Doppler memory having a sample-sequential input and a sample-parallel output, said Doppler memory organizing the sample-sequential input into blocks of n sequential samples and providing one of said blocks to said sample-parallel output; a code register organized for a sample-serial or a segment-serial input and a sample-parallel output, said sample parallel output having n parallel samples, the segmented code register configured to store the input samples in their order of input and to forward shift or backward shift the registered samples on each clock cycle prior to parallel output, said forward shift shifting the registered samples by one sample position and the backward shift shifting the registered samples by one segment of samples; and an inner product calculator having three sample-parallel inputs, each of said sample-parallel inputs having n parallel samples, said inner product calculator having one output representing the inner product of the three sample-parallel inputs.

In still another embodiment, the disclosure relates to a method of segmented correlation by providing a data memory for receiving a sample-sequential input and providing a sample-parallel output, the data memory organizing the sample serial input into blocks of n sequential samples; providing a code register organized for a sample-serial or a segment-serial input and a sample-parallel output, the sample parallel output having n parallel samples, the segmented code register storing the input samples in an order of input and one of forward- or backward-shifting the registered samples on each clock cycle prior to parallel output, the forward-shifting shifting the registered samples by one sample position and the backward-shifting shifting the register samples by one segment of samples per clock cycle; and correlating the code register contents with the data memory contents by calculating the inner product of the data memory parallel output with the code register parallel output for a sequence of code register shift positions.

A machine-readable medium stores a plurality of executable instructions to be executed by a processor to conduct segmented correlation method.

A method for segmented correlation according to one embodiment of the disclosure includes providing a data memory for receiving a sample-sequential input and providing a sample-parallel output, the data memory organizing the sample serial input into blocks of n sequential samples; providing a Doppler memory for receiving a sample-sequential input and providing a sample-parallel output, the Doppler memory organizing the sample serial input into blocks of n sequential samples; providing a code register organized for a sample-serial or a segment-serial input and a sample-parallel output, the sample parallel output having n parallel samples, the segmented code register storing the input samples in an order of input and one of forward- or backward-shifting the registered samples on each clock cycle prior to parallel output, the forward-shifting shifting the registered samples by one sample position and the backward-shifting shifting the register samples by one segment of samples per clock cycle; and correlating the code register contents with the data memory contents and the Doppler memory contents by calculating the inner product of the data memory parallel output with the code register parallel output and the Doppler memory parallel output for a sequence of code register shift positions.

Advantages of correlator architecture according to the embodiments disclosed herein include, among others, reducing the size of the post-correlation memory, decoupling the code-phase search length (number of code chips) from the integration (inner product) length, and preserving energy and speed for a massively parallel correlator. With the segmented code-phase correlator, the replica P/N code shift register is segmented into a number of same-length segments, with length of $L_{pc}$. Each shift-register segment can receive samples serially from the prior segment and can also receive all $L_{pc}$ samples in parallel from the following segment. This allows the full-length P/N code shift register to be shifted forward one sample per clock cycle and to also be shifted backward by a full segment length ($L_{pc}$) in one clock cycle. With this capability, a narrow range of $L_{pc}$ code-phases can be completely searched (all blocks of n Data memory samples processed) before testing of any other code phases, and thereby reducing the post-correlation memory size.

BRIEF DESCRIPTION OF THE DRAWINGS

The features of the disclosure are better illustrated with simultaneous reference to the following drawings in which.

DETAILED DESCRIPTION

As briefly discussed, GPS receivers acquire a satellite signal by cross correlating multiple variables including satellite code, code offset and Doppler frequency. Because of the associated Doppler frequency, often a multitude of frequency offset must be considered before the proper code offset can be obtained. To this end, frequency search is conventionally performed by cross-correlating the received signal with a replica of locally-generated P/N sequence (the satellite code), code offset (or code phase) and Doppler shift. More specifically, a segment of the received signal is massively modulated with the locally-generated satellite code (modulated by a local oscillator) and with the Doppler frequency. The sum of the modulation products is then evaluated against other sums to detect coherence of the modulated signals. If a coherent signal is not detected, one or all of the satellite code, frequency offset and Doppler frequency is changed and the process is repeated. A more elaborate discussion of conventional signal acquisition process is provided in U.S. Pat. No. 5,896,304 which is incorporated herein in its entirety for background information.

Figure 1:
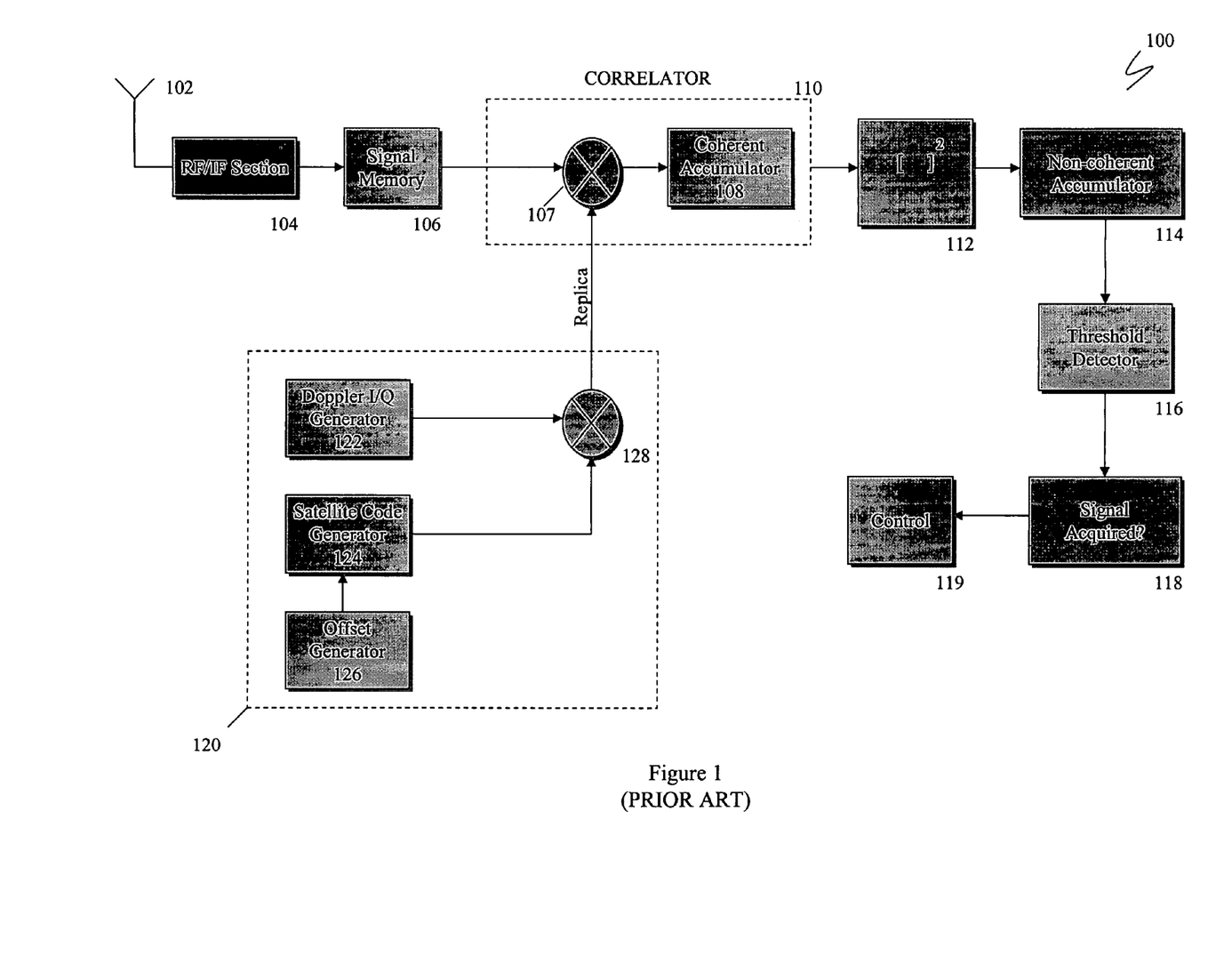
FIG. 1 is a block diagram of a conventional sequential signal processing architecture.

FIG. 1 is a block diagram of a conventional sequential signal processing architecture. Referring to FIG. 1, antenna 102 receives a satellite signal which is subsequently processed through RF/IF section 104. RF/IF section 104 processes the signal through a low pass filter (not shown) and performs A/D conversion by sampling the signal (not shown). The digital signal is then stored in signal memory 106 for downstream processing.

Although not shown in FIG. 1, each sample can be conveniently encoded in sign-magnitude (S/M) format using only two data bits. To insure signal detection, both In-phase ("I") and Quadrature phase ("Q") RF/IF output signals must be generated, stored, and processed (only one RF/IF channel is shown in FIG. 1). The use of three or more representation levels can provide substantial resistance to interference by non-GPS signals. However, a smaller data memory is required if only two representation levels (one bit) are used for the I and the Q signals. Conventionally, the I and Q RF/IF output signals are digitized and stored simultaneously in signal memory 106. The memory length 106 is sufficient to hold the entire data sequence needed to achieve acquisition (e.g., 20 ms). With 1023 C/A code chips per millisecond and both I and Q RF/IF signals being sampled at approximately two samples per code chip with two bits per sample, approximately 170,000 bits of storage is required for a 20 ms signal segment. For convenience, the I and Q data is shown as stored in signal memory 106 as opposed to separate I and Q memories.

The stored signal is then replayed (read) once during the correlation process for each Satellite-code, Code-offset and Doppler-frequency (SCD) combination. In the configuration of FIG. 1, the sequence of stored digital data samples are read from memory 106, one at a time. Then each sample of the data sequence from memory 106 is multiplied by the corresponding sample of the sequence data from the code/Doppler generator 120 by multiplier 108. The result is accumulated in coherent accumulator 110.

There are several advantages to storing the received signal segment in memory and re-reading the memory as needed to process different satellite codes 124, code offsets 126 and Doppler frequencies 122 (the "SCD bins"). First, the correlation process can take place over a period of time without loss of signal-acquisition accuracy due to local oscillator instability or inaccuracy. Second, if the stored signal is also used to derive the time delays needed for the navigation solution (the "tracking" process), there is no need to maintain accurate timing between the acquisition and tracking phases of GPS reception. Third, the acquisition processing speed is decoupled from the GPS signal sample arrival rate and is limited only by the process clock rate.

The sequence or data segment from the code/Doppler or replica generator is crafted for a particular combination of Satellite code, code offset and Doppler frequency under test. The length of the memory sequence so processed is the coherent integration length, and is typically chosen as one full cycle of the C/A code, which can be 1.0 milliseconds. Conventionally, twenty adjacent 1.0 ms memory data segments are processed in this manner without changing the replica sequence. After each 1.0 ms segment is processed, the value stored in coherent accumulator 108 represents the cross correlation between the 1.0 ms replica and data segments (or interchangeably, sequences). This value is squared by squarer 112 and added to non-coherent accumulator 114. Before the first 1.0 ms segment is processed for a given replica signal, non-coherent accumulator 114 is reset to zero so that the final accumulated result represents the total correlation score for the particular code, code offset and Doppler frequency specified by the replica signal. Similarly, the coherent accumulator is reset before each 1.0 ms segment is processed. Threshold detector 116 monitors the correlation score and produces a "signal acquired" indication if the score is larger than a specified threshold.

Upon receipt of a "signal acquired" indication, control 119 performs a simple peak-search and interpolation algorithm to find the best estimate of the code offset associated with the given code index and Doppler frequency under examination. Control 119 then selects another code, code-offset, and Doppler frequency combination and commands replica generator to alter the replica signal to reflect this change. The signal acquisition process is repeated for multiple replica signals corresponding to the codes, code offsets, and Doppler frequencies to be searched and is stopped when the desired number of GPS signals (different C/A codes) have been acquired. Finally, control 119 produces as an output signal the code indices, estimated offsets, and Doppler frequencies associated with the acquired signals.

The signal code offset can be measured by noting the replica-signal code offset associated with the cross-correlation peak. For example, a sequence of results from non-coherent accumulator 108 can be generated in order of increasing replica code-offset while holding the code index and Doppler frequency constant. If a large correlation result is observed, an interpolation algorithm can be applied to the sequence of results and a code-offset associated with the correlation peak can be estimated. A code-offset accuracy of one-tenth of a chip is achieved while sampling the signal at approximately twice the C/A code chip rate.

Figure 2:
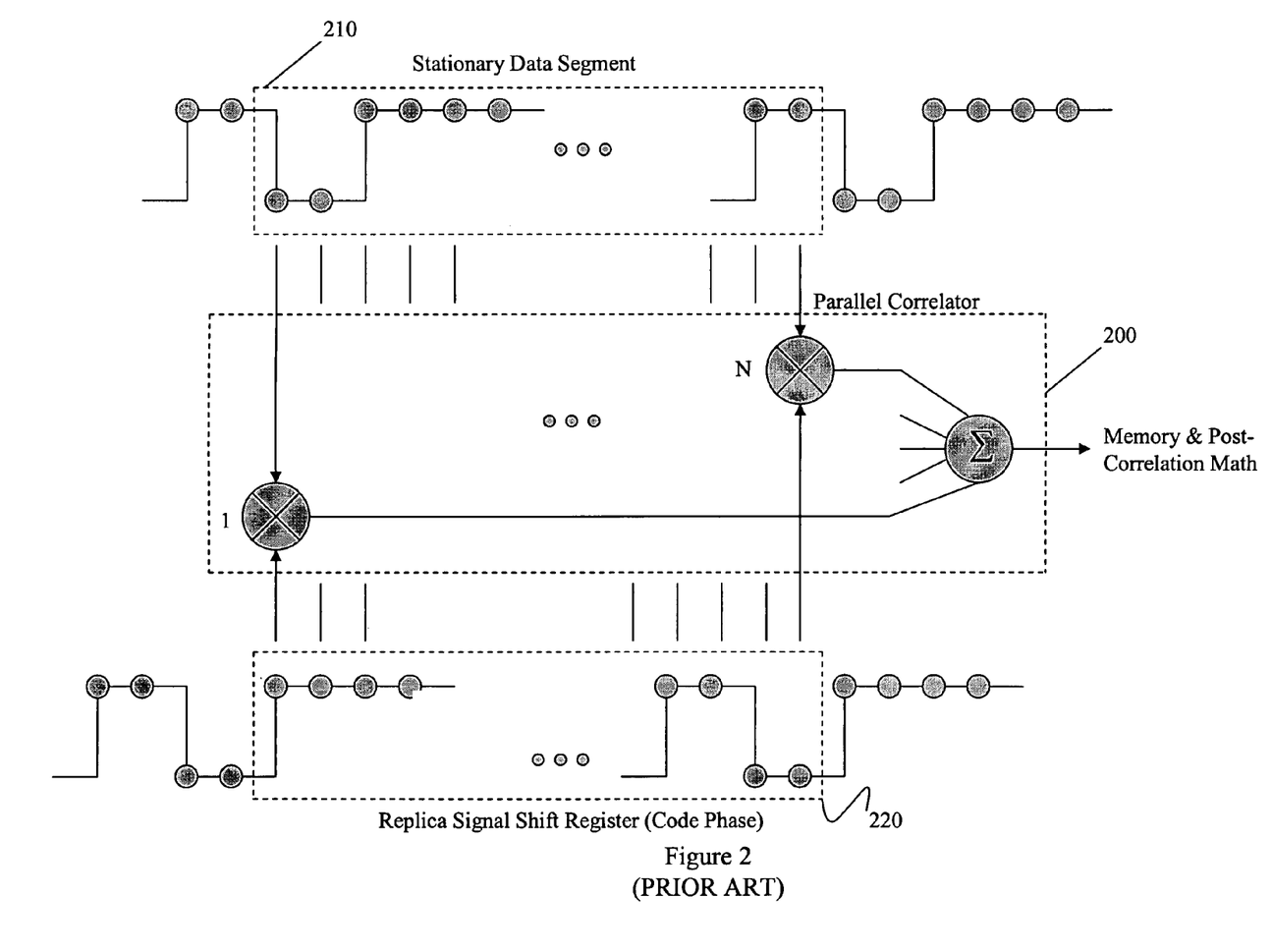
FIG. 2 is an illustration of a conventional cross correlation process for a data signal and a locally-generated replica signal.

FIG. 2 is an illustration of a conventional cross correlation process for a data signal and a locally-generated replica signal. Referring to FIG. 2, a satellite signal is shown as stationary data segment 210 having a length of 1.0 ms long. The stationary data segment 210 can be stored in signal memory 106 of FIG. 1. Parallel correlator 200 multiplies stationary data segment 210 with locally-generated replica signal 220 and provides a summation of the N multiplication results implemented as massively parallel. In FIG. 2 the code replica is assumed to be the product of a P/N code and a digitized sinusoidal generator (not shown). The result from the adder in 200 (i.e., the inner product of the two signals) is forwarded for storage and further mathematical processing. Thereafter, code phase 220 is shifted by one element while data segment 210 is maintained stationary. The inner product of the two signals is then obtained and stored. This process is repeated n times (n being the number of replica signal elements and the number of code phase tests) to obtain n different inner products of the two signals. When the incoming signal is sampled at the rate of approximately two samples per C/A code chip and digitized to three levels with an A/D converter using a two-bit sign-magnitude format, a sequence length of about 2046 samples is generated. Using the configuration of FIG. 2, data segment 210 is cross-correlated with 2046 code phase samples during the acquisition process to produce 2046 inner product results before replacing the stationary data memory segment with the next 1 ms segment and repeating the entire process. This process requires significant post-correlation memory space to hold all n intermediate cross correlation results.

To reduce the post-correlation memory size needed to acquire GPS satellite signals, one embodiment of the disclosure relates to a parallel correlator comprising a data memory, a segmented code register and an inner product calculator (interchangeably, data multiplier). The data memory can have a sample-sequential input and a sample-parallel output. Further, the data memory can be configured to organize the sample-sequential input into blocks of n sequential samples and provide any one of the blocks to the sample-parallel output. The data memory can be a RAM or a conventional shift register memory.

The code register can be organized for a sample-serial or a segment-serial input (for faster loading) and a sample-parallel output. The sample-serial input enables receiving one sample per clock cycle while the segment-serial input enables the code register to receive a segments (or a block) of samples per clock cycle. The sample parallel output can provide n parallel samples per clock cycle to the inner product calculator for correlation with the output of data memory. The segmented code register can be configured to register the input samples in their order of input and to one of forward-shift or backward-shift the registered samples on each clock cycle prior to providing an output. In one embodiment, the forward-shift shifts the registered samples by one sample position and the backward-shift shifts the registered samples by one segment of samples. As will be described in greater detail, each segment can be devised to include a number of samples to accommodate a smaller post-correlation memory size.

In an alternative embodiment, the data memory and the segmented code register can be devised to receive segmented-serial input instead of sample-serial loading. The segment-serial input can be used to expedite loading data into the memory.

The inner product calculator can include at least two sample-parallel inputs, each input having n parallel samples. The two sample-parallel inputs can communicate with the output from the code register and the output form the data memory. The inner product calculator may also have one output representing the inner product of the two sample-parallel inputs. During each clock cycle, the inner product calculator can receive an input signal from each of the data memory and the code register, provide a product of the two signals and forward the product for post-correlation processing.

Figure 3:
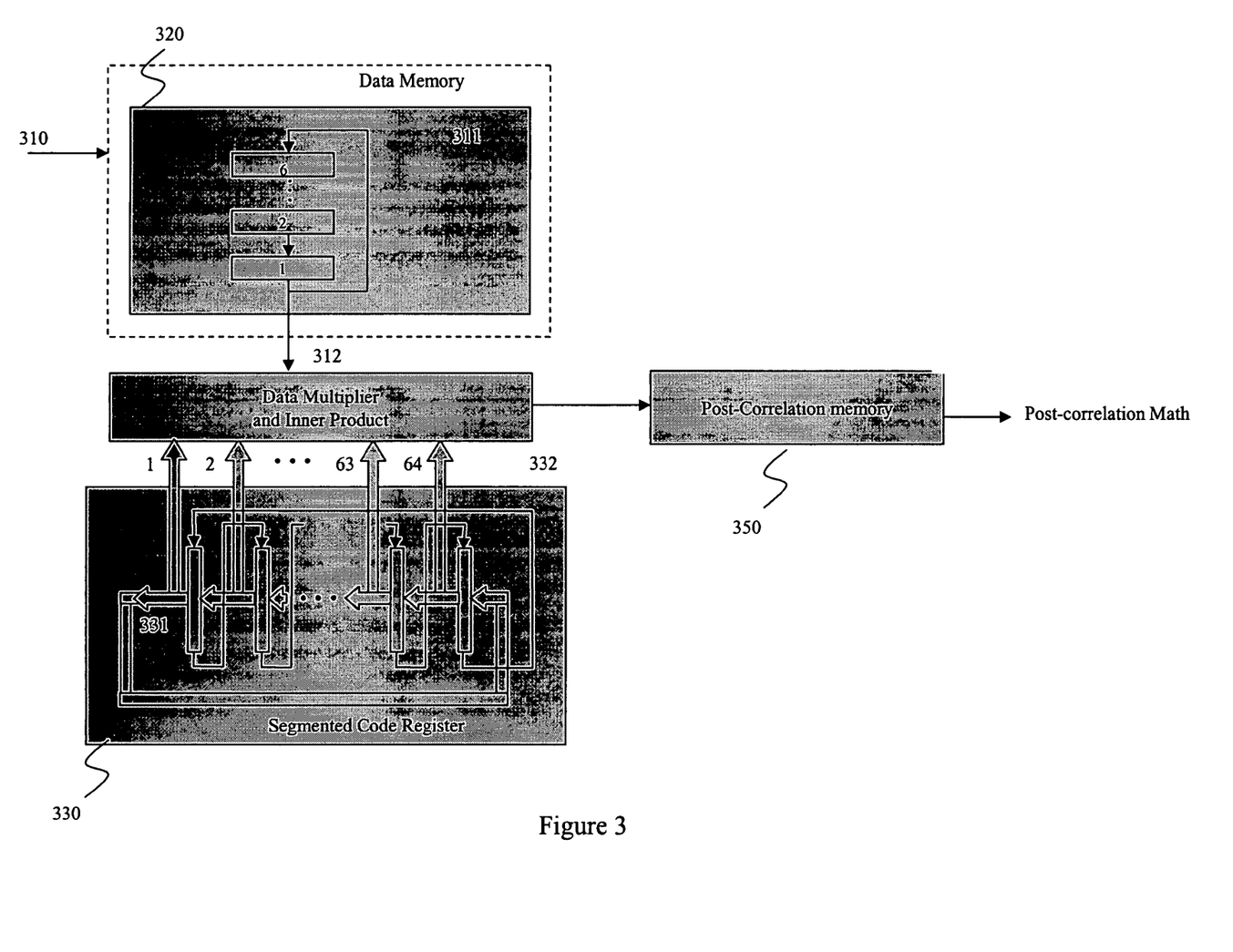
FIG. 3 schematically illustrates a segmented code-phase correlator architecture according to one embodiment of the disclosure.

FIG. 3 schematically illustrates a segmented code-phase correlator architecture according to one embodiment of the disclosure. With reference to FIG. 3, a first 1.0 ms incoming data segment 310 having 2046 element is directed to memory row 1. The next 1.0 ms segment of incoming data is directed to row 2. Data memory 320 is shown to have 6 exemplary rows. Thus, data can be loading while one row is providing data output for cross-correlation. In the exemplary representation of FIG. 3, data memory 320 is shown to operate as a Ferris wheel by allowing one data row (the output row) to communicate with inner product machine 312 and providing row-shifting capability between the memory rows. In the illustration of FIG. 3, memory row 1 is the output row. The output row is held in abeyance during successive clock cycles while segmented code register 330 is shifted and until the appropriate number of inner products are obtained. Thereafter, the memory rows are row shifted so that the next 1.0 ms data segment is directed to the memory output. With this data memory configuration, the memory rows can be circularly and non-destructively shifted so that all data moves to the adjacent row during a short period of time. In an alternative data memory architecture, the data rows are implemented as RAM and the output row is implemented as an output register communicating with the RAM. In this case, data remains stationary in RAM and need not be circulated.

In the exemplary embodiment of FIG. 3, it is assumed that the sampling rate is twice the chip rate and each data memory row can receive 2046 bits or data elements (n=2046). The data memory can also be adapted to receive input from an uninterruptible serial data source (i.e., the RF/IF section) and store the data in different memory rows.

Segmented code register 330 receives a locally-generated code sequence (i.e., P/N Code) as a sample-sequential or segment-sequential input (not shown). In the exemplary embodiment of FIG. 3, the code is partitioned into 64 (N=64) segments with all but one segment containing $L_{PC}$=32 bits of data ($L_{PC}$ is the smallest integer equal to or greater than n/N). One segment will contain fewer than 32 bits if n/N is not an integer. As will be further discussed, the post-correlation memory size is reduced by setting the segment length $L_{PC}$ to a value much smaller than n (e.g., much smaller than 2046). The code-register segments can be serially connected so that, for example, the first segment can contain the first 32 bits of data followed by the second segment containing data bits 33 to 64, etc. As stated earlier, the code register can be configured to provide one of a forward-shift or a backward-shift per clock cycle. During the forward shift, the code register can cylindrically shift the samples forward by one sample position per clock cycle. During the backward shift, the contents of the code register can be backward shifted (cylindrically) by a full segment length in a single clock cycle. Segmented code register 330 is also shown to have arrows 332 schematically showing the code register and its output partitioned into 64 segments, with all but the end segment having $L_{PC}$=32 bits. When n=2046, the final segment has only 30 bits. While code data is divided into 64 segments, at a given clock cycle all of the data samples (e.g., n=2046) are provided to Data Multiplier 312 for cross correlation with samples (n=2046) in one row of the Data Memory.

Data multiplier 310 performs a complex inner product of the content of code register 330 with the selected I and Q output row of data memory 320. The inner product can be directed to post-correlation memory 350 or other post-correlation math processing.

According to one embodiment of the disclosure, during one clock cycle an inner product of the content of the Code Register and Data Memory is produced, the result is stored in a memory buffer and samples in Code Register 330 are shifted by one code element. By shifting the segmented code register by one code element, a sequence of 2046 code elements is circulated such that the first code element is at the second position of Code Register 330 and code element 2046 is in position 1 of Code Register 330. In other words, the data in Data Memory row 1 can be held stationary while the samples stored in the segmented code register are cylindrically shifted "to the right" by one sample. This is considered to be a single forward shift of the code register. Alternatively, a single forward shift can be defined as a single cyclic shift to the left. The cross-correlation results of these vectors can be directed to post-correlation memory 350.

This procedure can be repeated for a number of iterations, for example, for $L_{PC}$ iterations with each of the $L_{PC}$ complex inner-product results being stored in the complex post correlation memory. In an exemplary embodiment, the segment length is 32 samples; therefore, 32 inner products are obtained during 32 clock cycles with the results being stored in Post-Correlation Memory 350. After $L_{PC}$ inner products have been calculated for the first Data row, the code register has been forward shifted $L_{PC}$ times if each inner product is always followed by a forward shift. In this case, the code register must be backward shifted by $L_{PC}$ positions to prepare for processing the next Data row. This backward shift can be accomplished by simultaneously updating each code register cell (position) with the contents of the code register cell that is $L_{PC}$ positions in the forward direction. With n=2046 and $L_{PC}$=32, this implies that code register cell 2014 gets updated with the contents of cell 2046, cell 2015 gets updated with the contents of cell 1, and cell 2016 gets updated with the contents of cell 2. Cylindrical forward shifting requires connecting the output of cell n=2046 to the input of cell 1, and this line may be undesirably long in an integrated. The long lines that connect cell 2015 to cell 1 and cell 2016 to cell 2 can be avoided by appending a two-cell shift register to the output of cell 2046 and clocking these cells with each forward shift of the code register. These appended cells will then always contain a copy of the code samples in cells 1 and 2 but these cells can be located very near cell 2046 and cells 2015 and 2016. Using this method, the backward shifting connectivity is as shown in FIG. 3. Alternatively, the final inner product in each code-phase segment need not be followed by a forward shift (unless the final Data row is being processed). Instead, the code register contents can be reset to the desired starting position by backward shifted only $L_{PC}$−1 positions. In FIG. 1 peak 150 represents the Raman spectrum, peak 140 is the peak of the emission spectrum and peak 130 is the peak of the absorption spectrum for a sample under study. Although not shown, Data Memory 320 and Inner Product calculator 312 can each consist of separate I- and Q-components.

In an exemplary method for operating the cross-correlation device of FIG. 3, Data Memory 320 receives sample-sequential input from the RF/IF section and provides sample-parallel output. Data Memory 320 also organizes the sample serial input into blocks of n sequential samples. Segmented Coder Register 320 receives sample-serial input and provides a sample parallel output having n parallel samples. Segmented Code Register 320 may store the input samples in an order of input. During each clock cycle, Code Register 320 can one of forward shift or backward shift the content of the Code Register prior to providing parallel output. In the forward shift mode, the content of the Code Register are forward shifted by one sample per clock cycle. In the backward shift mode, the content of the Code Register are shifted back by one segment length per clock cycle. During each clock cycle, Inner Product calculator 312 receives inputs from each of Data Memory 320 and Segmented Code Register 330 Inner Product calculator 312 correlates the inputs and provides the results to Post-Correlation memory 350. The capacity of Post-Correlation memory 350 can be selected to accommodate the number of samples in one segment, or the number of samples in each segment can be configured to accommodate the post-correlation memory.

Figure 4:
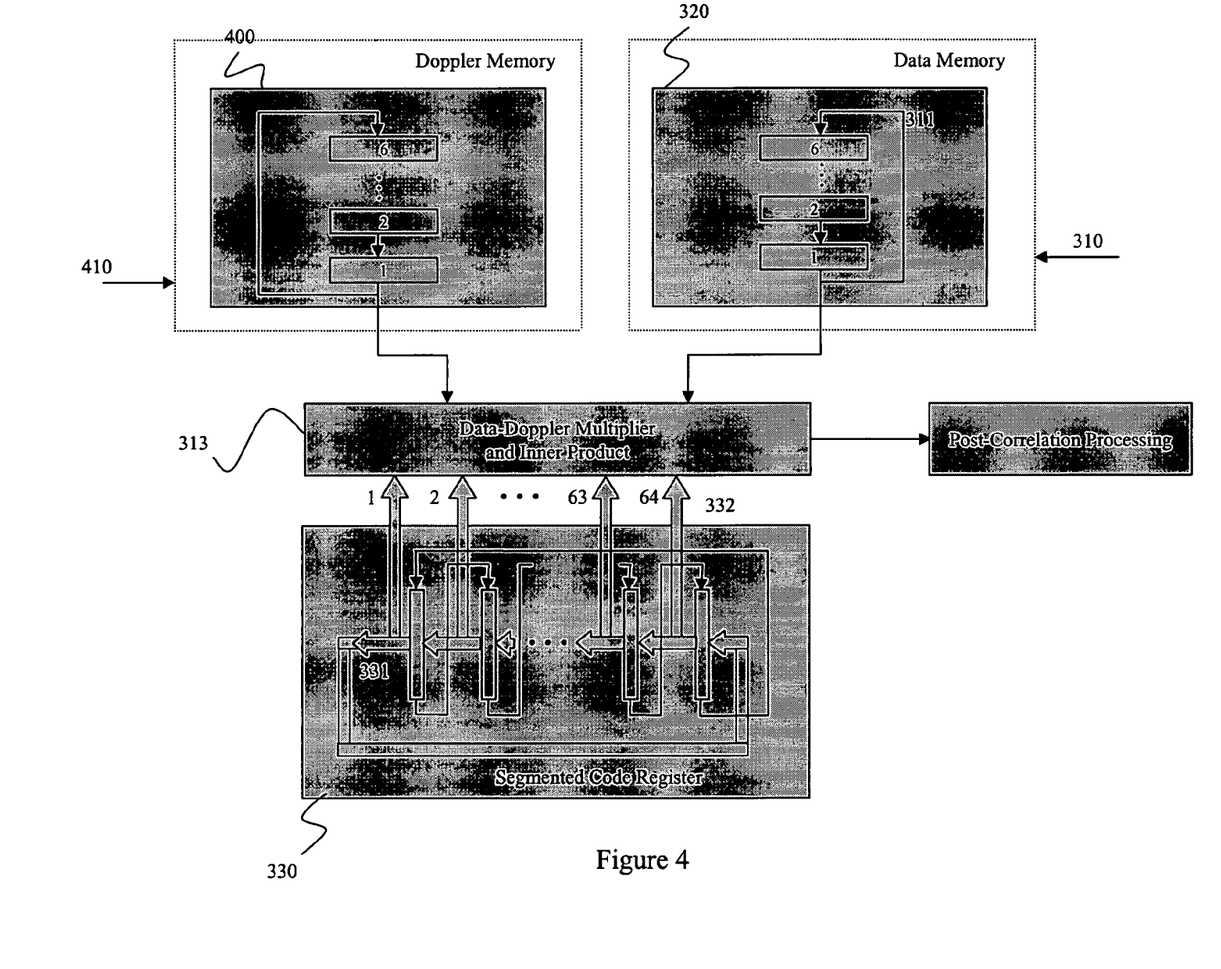
FIG. 4 schematically illustrates a segmented code-phase correlator according to another embodiment of the disclosure.

The principles discussed in relation with FIG. 3 can be extended to cross correlate three vectors simultaneously. FIG. 4 schematically illustrates a segmented code-phase correlator according to another embodiment of the disclosure. As compared with the embodiment of FIG. 3, the embodiment of FIG. 4 includes Doppler Memory 400, thereby providing a cross correlation of three vectors (i.e., Doppler sequence, code sequence and data sequence.) One advantage of the embodiment of FIG. 4 is that multiple Doppler frequency shifts can be searched without changing the data stored in the Data Memory. To search a different Doppler frequency, a new Doppler sequence is loaded into the Doppler Memory 400.

Referring to FIG. 4, a segmented code-phase correlator includes Doppler Memory 400, Data Memory 320, Segmented Code Register 330 and Data-Doppler Multiplier and Inner Product calculator 313. Data Memory 320 may receive a sample-sequential input and provide a sample-parallel output. Data Memory 320 can organize the sample-sequential input into blocks of n sequential samples and provide one of said blocks at any given time as the sample-parallel output.

Doppler Memory 400 may include a sample-sequential input and a sample-parallel output. The Doppler Memory can also be configured to organize the sample-sequential input into blocks of n sequential samples and to provide one of said blocks to said sample-parallel output. In the embodiment of FIG. 4, each of Doppler Memory 400 and Data Memory 320 are shown to receive sample-sequential input into six rows of memory. It is important to note that the principles of the disclosure are not limited thereto and may include fewer or more than six rows or memory. Moreover, the signal input to each of Data Memory 320 and Doppler Memory 400 may include segment-serial input for expedited processing.

As in the embodiment of FIG. 3, Code Register 330 can be organized for a sample-serial or a segment-serial input and a sample-parallel output. The sample parallel output can have n parallel samples and the Segmented Code Register can be configured to store the input samples in their order of input. During each clock cycle and prior to providing an output, the Code Register may one of forward shift or backward shift the sample contents of the Register. As in the embodiment of FIG. 3, the forward shifting may shift the samples by one sample position and the backward shifting may shifting shift the samples by one segment length. The segment length can be varied to provide an optimal tradeoff between correlator size and energy consumption.

The Data-Doppler Multiplier and Inner Product calculator 313 is shown to have three sample-parallel inputs, each of said sample-parallel inputs having n parallel samples. The inner product calculator provides one complex output representing the complex inner product of the three sample-parallel inputs. As an example, block 313 can calculate the complex inner product first calculating the complex sample-by-sample product of the complex Data and Doppler vectors, and then calculating the inner product of the resulting Data-Doppler product I vector with the Code vector and also calculating the inner product of the resulting Data-Doppler product Q vector with the Code vector. The result is a complex (I and Q) inner product result for each code-shift position. The operation of Data-Doppler Multiplier and Inner Product block 313 can therefore be similar to that shown in FIG. 2.

An exemplary method for segmented correlation using the correlator of FIG. 4 can include providing Data Memory 320 for receiving sample-sequential input 310 and having a sample-parallel output 322. Data Memory 320 can be adapted to organize the sample-serial input into blocks of sequential samples, each block containing n samples. Next, Doppler Memory 400 provides for receiving a sample-sequential input 410 and providing sample-parallel output 422. The Doppler Memory can organize the sample-serial input into blocks of n sequential samples. As before, each sample may further comprise an in-phase component and a quadrature component (not shown). Furthermore, the Doppler memory may be organized as a Ferris wheel with dedicated output row, or as a RAM with an output register.

The Code register 300 can be organized as described earlier with respect to FIG. 3.

Thus, on each clock cycle, Data-Doppler Multiplier 313 receives and multiplies data from each of Doppler Memory 400, Data Memory 320 and Code Register 332 and the results are forwarded for post-correlation processing. The segmented code-phase correlator can be configured to perform a number of inner products equal to the length of a segment. In an exemplary embodiment, the sample content (n=2046) of Code Register 332 is organized to about 64 segments with each segment containing roughly 32 samples. During each of the first 32 clock cycles cross correlation is performed between the content of the first row of each of Doppler Memory 400, Data Memory 320 and the entire length of Code Register 332. In addition, during each of the first 32 clock cycles, the content of Code Register 332 is circularly shifted by one sample prior to providing an output. After the first 32 clock cycles, Code Register 332 backward shifts its content by 32 samples thereby returning all code samples to their starting positions. Simultaneously, each of Data Memory 320 and Doppler Memory 400 can switch their respective output rows from the first row to the second row. The above single-row procedure is repeated for all Data (and Doppler) rows to form a multiple-row procedure, with the cross-correlation results for all rows being further processed by the post-correlation processor and accrued in post-correlation memory. In the exemplary process, the multiple-row procedure generates the 32 cross-correlation output samples associated with code offsets 0 through 31. In the final single-row procedure of each multiple-row procedure, the backward shift of the Code Register is replaced with a single forward shift. This prepares the Code Register for the next multiple-row procedure that examines code offsets 32 through 63. At the end of each multiple-row procedure, the post-correlation results can be examined for signal acquisition and the post-correlation memory can be reset to zero. The multiple-row procedure is repeated until all code offsets have been examined.

Figure 5:
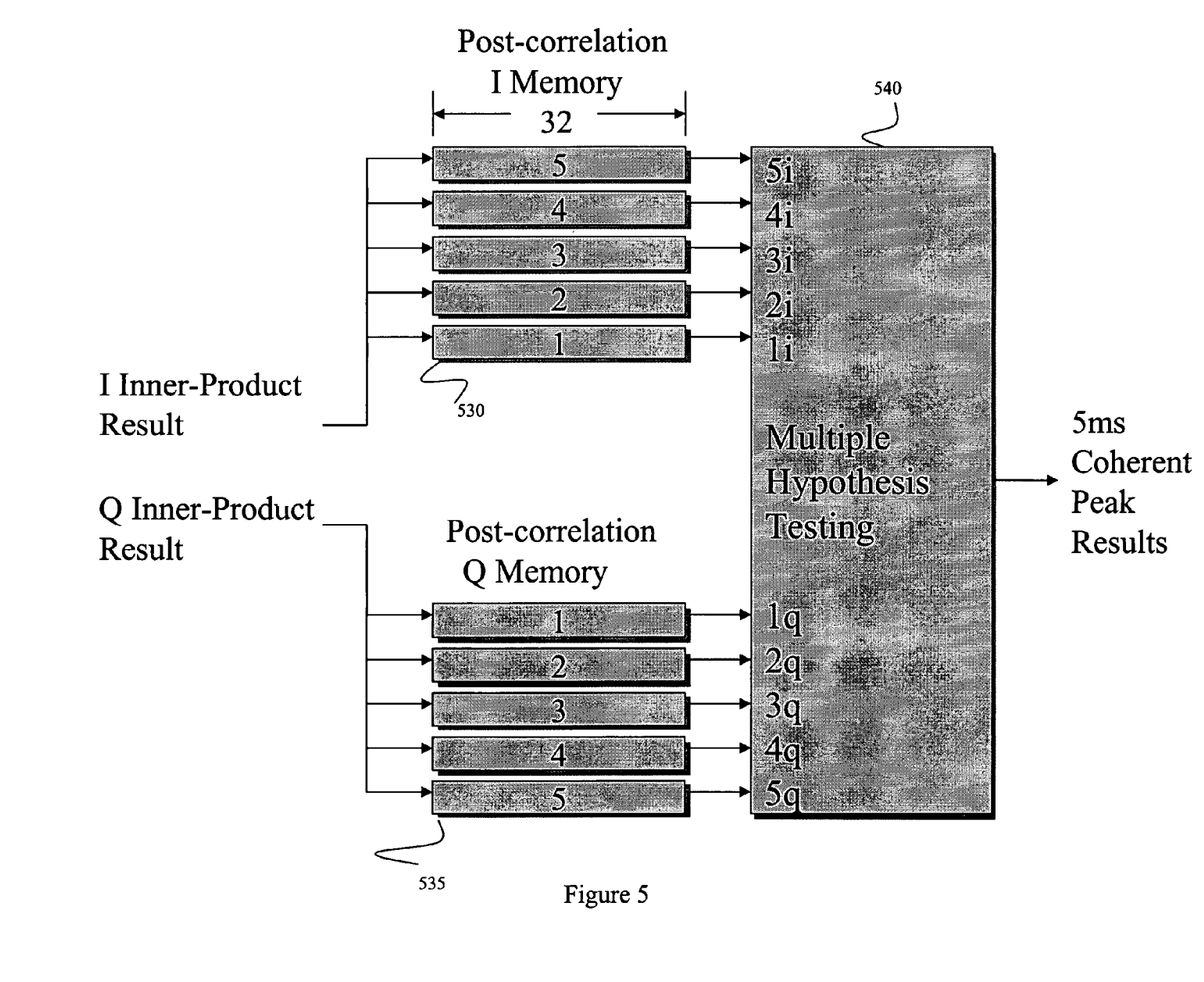
FIG. 5 shows the post Multiplier processing for the I and Q phases.

FIG. 5 shows a post-correlation architecture for an embodiment where each cross-correlation output sample further comprises in-phase (I) and quardrature-phase (Q) components. After each successive operation of the Data Multiplier 312, or Data-Doppler Multiplier 313, the I and Q results are forwarded to I and Q post-correlation memory, 530 and 535, respectively. Consistent with the exemplary embodiments of FIGS. 3 and 4, all rows of post-correlation memories 530 and 535 are shown to have a length equal to $L_{PC}$ (e.g., 32). It can be readily seen that as compared with the conventional post-correlation memory devices (2046 bit buffer size), the memory size is substantially reduced by implementing the inventive principles disclosed herein. It is also readily apparent that the number of rows of post-correlation memory (five shown) is consistent with the number of active rows in Doppler memory 400 or Data Memory 320 (see FIGS. 3 and 4.) By reducing the memory size, the area and cost of an integrated-circuit implementation of this invention is reduced.

Multiple-hypothesis testing is conducted at Post-Correlation Math block 540 in FIG. 5. Each GPS signal is modulated by Navigation Data at 50 bits per second and the Navigation Data bits will cause possible changes in the sign of the received I-Q signal at every twentieth code-cycle boundary. If an unanticipated transition of a Navigation data bit occurs within the stored I-Q data, the coherent integration will be corrupted and detection probability or false-alarm rate will suffer. One way to avoid this corruption is to separately test for all feasible locations of a Navigation data-bit transition within the stored I-Q data. According to one embodiment of the disclosure, for each code-phase test (code-sequence position in the code register) the correlator is hypothesizing that the code phase is correct and then tests for sufficient correlator-output energy. To this hypothesis we add the further hypothesis of a Navigation data-bit transition at the hypothesized code-cycle boundary. The hypothesized code-cycle boundary may not align with the edge of the 2046-long inner product because signal storage is not synchronized with GPS-signal Navigation-bit timing. If fewer than 20 I-Q data rows are stored, then a data-bit transition hypothesis will be similar to hypothesizing that the Navigation data bit was one sign for all earlier stored I-Q Data rows, and is the opposite sign for all later stored I-Q Data rows. However, the stored data row containing the data-bit transition will likely yield a corrupted inner-product result because the transition is not necessarily at the edge of the stored row. Corruption of the acquisition result can be avoided by eliminating this rows inner-product from the post-correlation summation. This means that one extra I-Q Data row must always be processed so that the required number of 1 ms coherent integrations (e.g., 4) are always available when one inner product is eliminated. In the exemplary embodiment of FIG. 5, the desired coherent processing length is 4 ms, so five 1 ms I-Q Data rows must be processed. This means that the I-Q Data memory must have 6 rows as shown in FIGS. 3 and 4, if the data memory is to be implemented as a row shift register. (one extra row is needed to allow row shifting.) Only 5 rows are needed if the memory is implemented as RAM.

Figure 8:
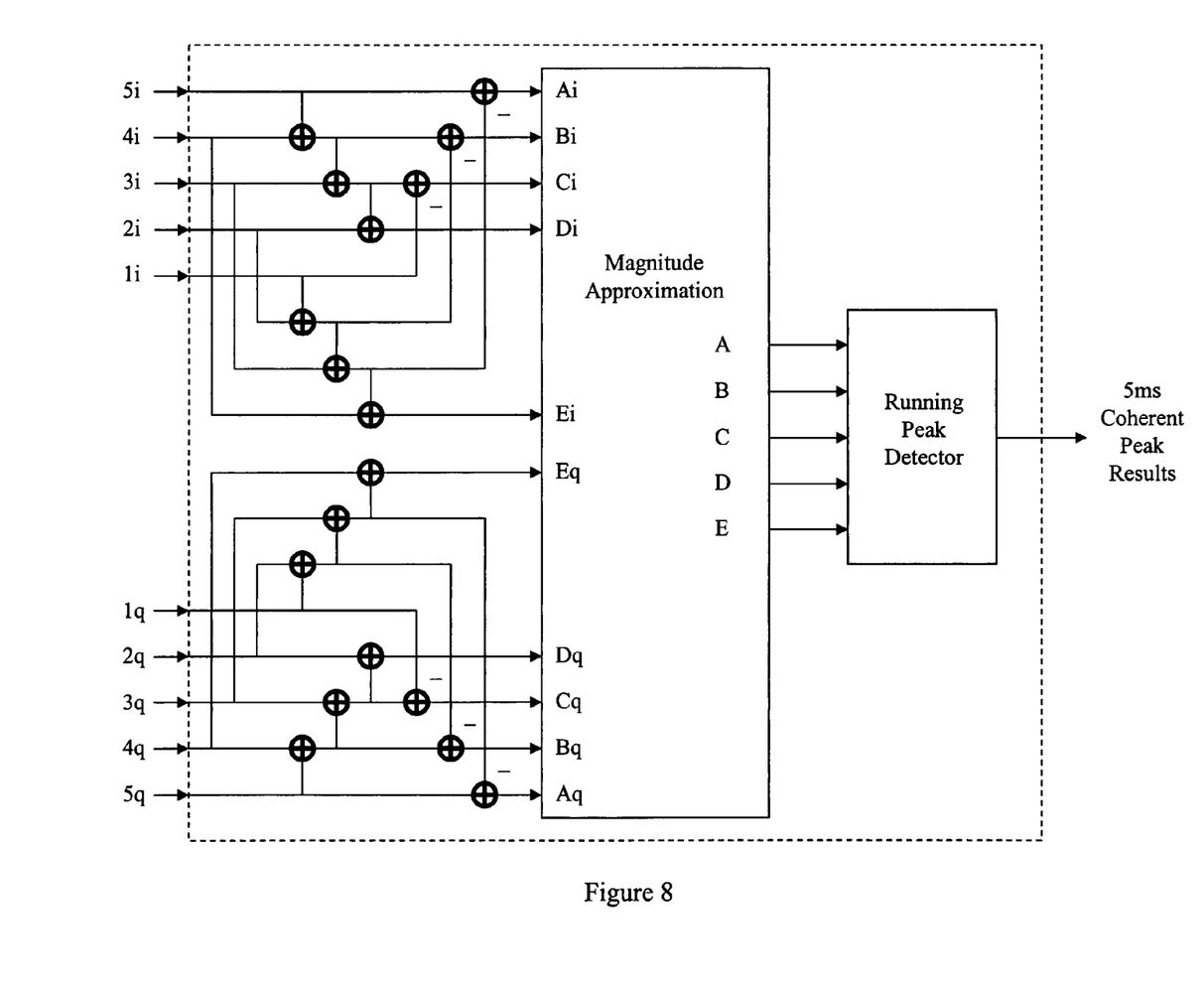
FIG. 8 shows an algorithm for data edge hypothesis testing according to one embodiment of the disclosure.

For a given hypothesized code phase and any 5 ms stored I-Q Data sequence, there can be 5 possible positions for a Navigation Data bit transition because the bit transitions can occur only at code-cycle boundaries. In one embodiment, the different bit-transition hypotheses can be tested by separately storing the correlation results for each I-Q Data row and then summing the row results after changing the sign for the appropriate rows. This allows the same cross-correlation results to be used for different data-bit transition hypotheses. However, it also increases the size of the post-correlation memory by a factor equal to the number of bit-transition hypotheses. The row-result sign changes and summations are performed in the Post-Correlation Math block 540 in FIG. 5. An example of the math process is shown in FIG. 8 for simultaneous I and Q correlator output processing.

The overall hardware cost of bit-boundary testing in the example of FIG. 1 is a) one additional row of I-Q Data must be stored and processed, b) the post-correlation memory grows by a factor of 5, c) extra post-correlation math is required. When $L_{pc}$=32, these costs are not prohibitive. However, they can be eliminated by assuming there is no Navigation Data bit transition within the stored I-Q Data. For a coherent processing length of 4, a bit boundary will fall in the 4 ms I-Q Data segment only 20% of the time. When this occurs, the chance of a sign change at the boundary is about 50%. That is, the probability of a miss will be approximately 0.1 due solely to the bit transitions. If this probability is unacceptable, then a second set of I-Q Data can be captured and processed if the first data set fails to yield enough acquisitions. If the first I-Q Data set had a bit transition for some satellite signal, then a second I-Q Data set cannot have a bit-sign transition if the delay between the first and second I-Q data captures is between 5 ms and 10 ms (plus an integer number of 20 ms periods). By using sufficiently accurate inter-capture timing, the missed detection can be avoided in the second data set.

Figure 6:
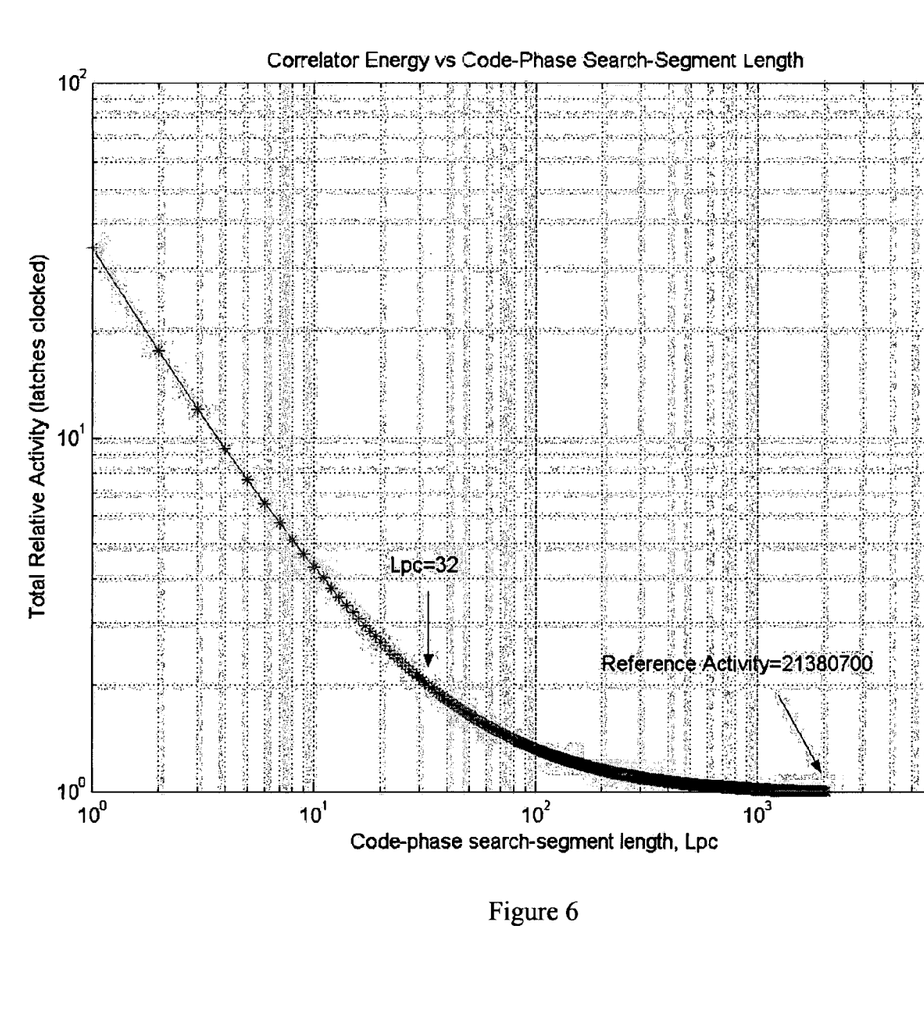
FIG. 6 comparatively compares the number of latches clocked versus code phase segment length ($L_{PC}$)
Figure 7:
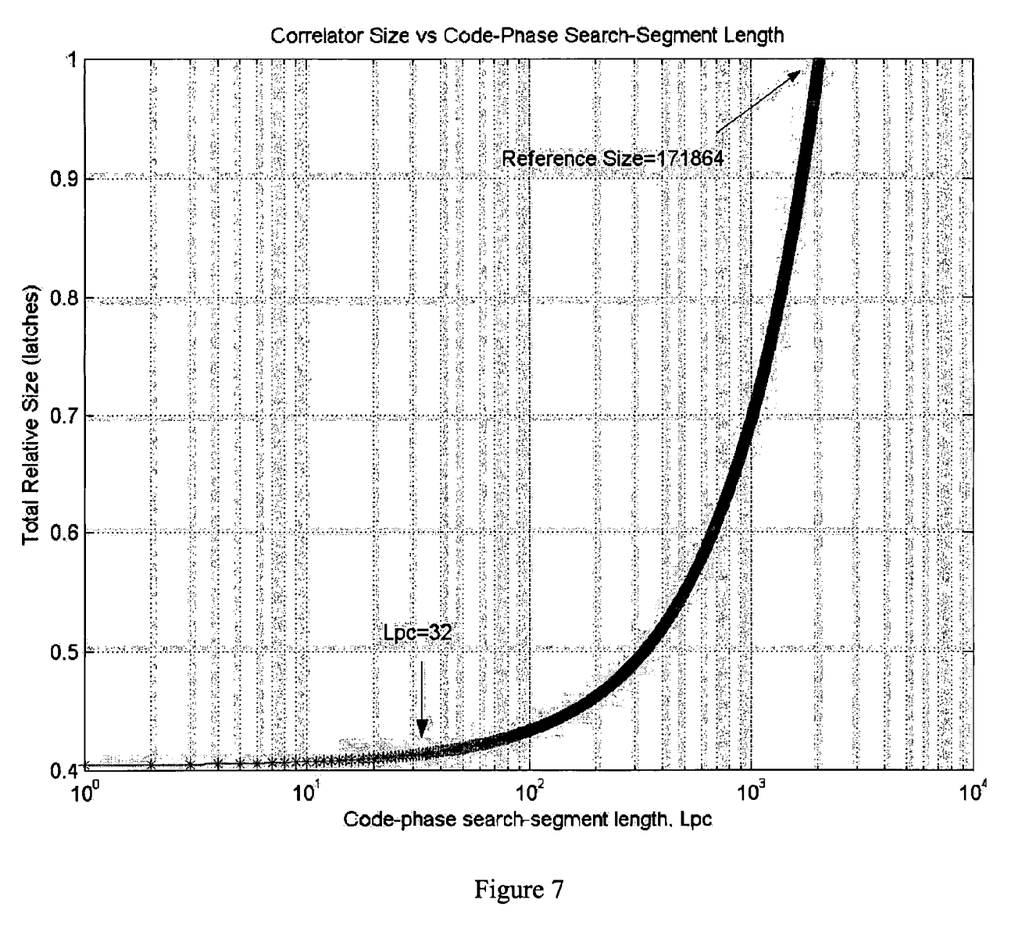
FIG. 7 compares the total number of latches versus code phase segment length ($L_{PC}$)

FIGS. 6 and 7 indicate how correlator energy consumption and size depend on the chosen code-phase segment length. Correlator energy consumption is rated in terms of total code/data/Doppler and post-correlation "activity", with activity defined as the clocking of a memory cell or latch. Correlator size is rated in terms of the total number of latches or memory cells. For simplicity, all Code, Data, Doppler, and Post-Correlation memory and register cells are considered to have the same size and energy consumption as a typical "latch" in digital design. FIG. 6 shows that the relative activity decreases rapidly as the segment length is increased from 1, but that the activity approaches a minimum value (the Reference Activity level) as the segment length approaches 2046. This is explained by noting that activity is dominated by code-register shifting when the segment length is 2046, but becomes dominated by re-reading of the Data and Doppler memory as the segment length is made short. For the embodiment described above with Lpc=2046, the total Reference Activity is 21380700 or approximately 21-million latch-clock operations.

FIG. 7 shows that the correlator total relative size decreases continuously from the Reference Size value as the segment length is decreased from 2046, but that it then approaches a minimum value as the length approaches 1. This is explained by noting that the post-correlation memory size is smallest for a code-phase segment length of 1 and grows linearly with segment length. For the embodiment described above with Lpc=2046, the total Reference Size is 171864, or approximately 170-thousand latch equivalents. FIG. 7 shows that a code-phase search-segment length (Lpc) of 32 cuts the memory-size by more than half with respect to the size when Lpc=2046. FIG. 6 shows that at Lpc=32, the energy consumption is doubled with respect to that when Lpc=2046. Other values of Lpc can be used to achieve other desired size-energy tradeoffs. Actual tradeoff performance will be depend on the specific design of the latches and memory cells used.

FIG. 8 shows an algorithm for data edge hypothesis testing according to one embodiment of the disclosure. The mathematical algorithm shown in FIG. 8 implements the data-edge hypothesis disclosed above It is adapted for simultaneous processing of I and Q correlator outputs, but sequential processing of the I and Q inputs is also practical. For each code-phase test, the algorithm takes the associated I and Q correlation-output samples from the five I and Q post-correlation memory rows as input. It is assumed that the post-correlation memory rows 1-5 are filled time sequentially so that a Navigation bit transition will yield a sign change in the correlation results as discussed earlier. The algorithm then assumes samples in the I or Q rows prior to the hypothesized bit edge are positive, and that the samples in rows after the bit edge are negative. I samples from the rows after the edge are inverted and summed with the I samples prior to the edge to yield an I sum. Q samples are treated similarly to yield a Q sum. The I and Q sums can then be non-coherently combined as is normal practice (e.g., squared and added). This process is repeated (either simultaneously or sequentially) for all five possible bit-edge hypotheses. The overall hardware cost of bit-boundary testing in the embodiment of FIG. 8 can be summarized as follows: (i) an additional row of I/Q Data must be stored and processed; (ii) the post-correlator memory grows by a factor of 5; (iii) additional post-correlation math algorithm is required. In an embodiment of the disclosure where $L_{PC}=n/N=32$, the costs are not prohibitive. However, they can be eliminated by assuming that there is no Navigation Data bit transition within the stored I/Q Data.

For a coherent processing length of 4, a bit boundary will fall in the 4 ms I-Q Data segment only 20% of the time. When it does, the probability of a sign change at the boundary is 50%. This implies that the probability of a miss will be approximately 0.1 due solely to the bit transitions. If this probability is unacceptable, then a second set of I/Q data can be captured and processed if the first data set did not yield enough acquisitions. If the first I/Q Data set had a bit transition for some satellite signal, then a second I/Q data set cannot have a bit-sign transition if the delay between the first and second I/Q data capture is between 5 ms and 10 ms (plus an integer number of 20 ms periods). By using sufficiently accurate inter-capture timing, the missed detection can be avoided in the second data set.

It should be noted that extra Navigation Data bit transition hypotheses can actually increase the probability of false detection because there are five times as many opportunities for a false alarm. However, a Gaussian-noise analysis shows that the increased false detection rate is equivalent to very small loss in SNR.

It should be understood that the embodiments presented herein are exemplary and non-limiting. Applications of the principles of the disclosure as disclosed herein can be implemented in variety of context, for example, telecommunication processing and other similar applications.

What is claimed is:

1. A parallel correlator comprising:
a data memory having a sample-sequential input and a sample-parallel output, said data memory organizing the sample-sequential input into blocks of n sequential samples and providing each of said blocks cyclically to said sample-parallel output;
a segmented code register organized to receive a code sequence as an plurality of input samples, said segmented code register organizing the input samples into N segments of L length, wherein N is less than n and greater than one; the segmented code register configured to register the input samples in their order of input and to one of forward-shift or backward-shift the registered samples on each clock cycle prior to parallel output, said forward-shift shifting the registered samples by one sample position and the backward-shift shifting the registered samples by one segment of samples; said segmented code register having a sample parallel output; and
an inner product calculator having at least two sample-parallel inputs, said inner product calculator having one output representing the inner product of the two sample-parallel inputs; wherein a first of said N segments is provided to the inner product calculator for processing with each of said blocks prior to providing a second of said N segments to the inner product calculator for processing with any of said blocks.

2. The parallel correlator of claim 1, wherein the sample-parallel output of the data memory defines a first input to the inner product calculator and the sample-parallel output of the segmented code register defines a second input to the inner product calculator.

3. The parallel correlator of claim 1, further comprising a Doppler memory, the Doppler memory having a sample-sequential input and a sample-parallel output, said Doppler memory organizing the sample-sequential input into blocks of n sequential samples and providing each of said Doppler memory blocks cyclically as the sample-parallel output to said inner product calculator.

4. The parallel correlator of claim 3, wherein the sample-sequential input to the Doppler memory defines an inner product of samples from a Doppler sequence, a Data sequence and a code sequence.

5. The parallel correlator of claim 3, wherein the sample-parallel output of the Doppler memory defines a third input the inner product calculator.

6. The parallel correlator of claim 1, further comprising a post-correlation memory for storing and accumulating the inner product of the two sample-parallel inputs received from the inner product calculator.

7. The parallel correlator of claim 1, further comprising a post-correlation processor for coherent and non-coherent processing of the inner product.

8. The parallel correlator of claim 1, wherein each of said samples further comprises an in-phase component and a quadrature component.

9. The parallel correlator of claim 1, wherein the parallel correlator is adapted to process an in-phase component of a received signal in parallel with a quadrature component of the received signal.

10. The parallel correlator of claim 1, wherein ,the segmented-serial input defines an accelerated input to the segmented code register as compared to the sample-serial input.

11. The parallel correlator of claim 1, wherein the segmented code register is adapted to circularly shift the sample by one sample per clock cycle.

12. The parallel correlator of claim 1, wherein the segmented code register receives a new input sample per clock cycle.

13. The parallel correlator of claim 1, wherein the data memory is adapted to receive one sample as input and outputs a block of n sequential samples per clock cycle.

14. A parallel correlator comprising:
a data memory having a sample-sequential input and a sample-parallel output, said data memory organizing the sample-sequential input into blocks of n sequential samples and providing each of said blocks cyclically to said sample-parallel output;
a Doppler memory having a sample-sequential input and a sample-parallel output, said Doppler memory organizing the sample-sequential input into blocks of n sequential samples and providing each of said Doppler memory blocks cyclically to said sample-parallel output;

a segmented code register organized to receive a code sequence as a plurality of input samples, said segmented code register organizing the input samples into N segments of L length, wherein N is less than n and greater than one; the segmented code register configured to store the input samples in their order of input and to forward shift or backward shift the registered samples on each clock cycle prior to parallel output, said forward shift shifting the registered samples by one sample position and the backward shift shifting the registered samples by one segment of samples; said segmented code register having a sample parallel output; and an inner product calculator having three sample-parallel inputs, said inner product calculator having one output representing the inner product of the three sample-parallel inputs, wherein a first of said N segments is provided to the inner product calculator for processing with each of said blocks and Doppler memory blocks prior to providing a second of said N segments to the inner product calculator for processing with any of said blocks or Doppler memory blocks.

15. The parallel correlator of claim 14, wherein the sample-parallel output of the data memory and the sample-parallel output of the Doppler memory and the sample-parallel output of the segmented code register define the three sample-parallel inputs of the inner product calculator.

16. The parallel correlator of claim 14, further comprising a post-correlation memory for storing and accumulating the inner product of the three sample-parallel inputs from the inner product calculator.

17. The parallel correlator of claim 14, further comprising a post-correlation processor for coherent and non-coherent processing of the inner product.

18. The parallel correlator of claim 14, wherein each of said samples further comprises an in-phase component and a quadrature component.

19. The parallel correlator of claim 14, wherein the parallel correlator is adapted to process an in-phase component of a received signal in parallel with a quadrature component of the received signal.

20. The parallel correlator of claim 14, wherein the segmented code register receives the code segments as a segmented serial input and the segmented-serial input defines an accelerated input to the segmented code register as compared to a sample-serial input.

21. The parallel correlator of claim 14, wherein the segmented Code register is adapted to circularly shift the sample by one sample per clock cycle.

22. The parallel correlator of claim 14, wherein the segmented Code register receives a new input sample per clock cycle.

23. A method of segmented correlation comprising:
providing a data memory for receiving a sample-sequential input and providing a sample-parallel output, the data memory organizing the sample serial input into blocks of n sequential samples and providing each of said blocks cyclically to said sample-parallel output;
providing a segmented code register organized to receive a code sequence as a plurality of input samples said segmented code register organizing the input samples into N segments of L length, wherein N is less than n and greater than one, the segmented code register storing the input samples in an order of input and one of forward- or backward-shifting the registered samples on each clock cycle prior to parallel output, the forward-shifting shifting the registered samples by one sample position and the backward-shifting shifting the register samples by one segment of samples per clock cycle; said segmented code register having a sample parallel output; and
correlating the output from the segmented code register with the sample serial output from the data memory to provide a correlation result representing the inner product of the data memory and the segmented code register; wherein a first of said N segments is correlated with each of said blocks prior to correlating a second of said N segments with any of said blocks.

24. The method of claim 23, further comprising providing a Doppler memory having a sample-sequential input and a sample-parallel output, said Doppler memory organizing the sample-sequential input into blocks of n sequential samples and providing each of said Doppler memory blocks cyclically as the sample-parallel output for correlation.

25. The method of claim 24, wherein the Doppler memory defines an inner product of samples from each of a Doppler sequence, a data sequence and a code sequence.

26. The method of claim 23, wherein the sample-parallel output of the Doppler memory defines a third input into the inner product calculator.

27. The method of claim 23, further comprising providing a post-correlation memory for storing and accumulating the inner product of the two sample-parallel inputs from the inner product calculator.

28. The method of claim 23, further comprising providing a post-correlation processor for coherent and non-coherent processing.

29. The method of claim 23, wherein each of said samples further comprises an in-phase component and a quadrature component.

30. The method of claim 23, wherein the step of correlating the segmented sample output from the segmented code register with the sample serial output from the data memory further comprises correlating an in-phase component of a received signal in parallel with a quadrature component of the received signal.

31. The method of claim 23, further comprising the step of receiving a new input sample at the code register per each clock cycle.

32. A method for segmented correlation, comprising:
providing a data memory for receiving a sample-sequential input and providing a sample-parallel output, the data memory organizing the sample serial input into blocks of n sequential samples and providing each of said blocks cyclically to said sample-parallel output;
providing a Doppler memory for receiving a sample-sequential input and providing a sample-parallel output, the Doppler memory organizing the sample serial input into blocks of n sequential samples;
providing a segmented code register organized to receive a code sequence as a plurality of input samples, said segmented code register organizing the input samples into N segments of L length, wherein N is less than n and greater than one, the segmented code register storing the input samples in an order of input and one of forward- or backward-shifting the registered samples on each clock cycle prior to parallel output, the forward-shifting shifting the registered samples by one sample position and the backward-shifting shifting the register samples by one segment of samples per clock cycle; said segmented code register having a sample parallel output and
correlating the segmented sample output from the segmented code register with the sample serial output from the data memory and the Doppler memory to provide a an inner product result; wherein a first of said N segments is correlated with each of said blocks and Doppler memory blocks prior to correlating a second of said N segments with any of said blocks and Doppler memory blocks.

33. The method of claim 32, wherein the sample-parallel output of the data memory, the sample-parallel output of the Doppler memory and the sample-parallel output of the segmented code register define the three sample-parallel inputs of the inner product calculator.

34. The method of claim 32, further comprising storing the inner product result in a post-correlation memory.

35. The method of claim 32, further comprising processing the inner product result to define a coherent or a non-coherent result.

36. The method of claim 32, wherein each of said samples further comprises an in-phase component and a quadrature component.

37. The method of claim 36, further comprising processing the in-phase component of the received signal in parallel with the quadrature component of the received signal.

38. The method of claim 32, further comprising the step of receiving a new input sample at the segmented code register per each clock cycle.

39. A machine-readable medium having stored thereon a plurality of executable instructions to be executed by a processor to conduct segmented correlation method, the method comprising:
  receiving a first signal and organizing sampled elements representing said first signal into a plurality of blocks each having n sequential first samples;
  receiving a second signal and organizing sampled elements representing said second signal as N segments of L length, wherein N is less than n and greater than one;
  cross-correlating the n sequential first samples with a first of said N segments at first clock cycle;
  circularly forward-shifting the first N segment by one sample and cross-correlating the shifted first N segment with n sequential first samples at second clock cycle;
  repeating the step of circularly forward-shifting the first N segment for P clock cycles; and
  circularly backward-shifting the first N segment by L elements after P+1 clock cycles:
  wherein the first N segment is cross-correlated with the n sequential first samples of each of the plurality of blocks prior to cross-correlating another of the N segments with any of the plurality of blocks.

40. The machine readable medium of claim 39, wherein the step of receiving a first signal further comprises retrieving the first signal from memory.

41. The machine readable medium of claim 39, wherein the step of receiving and organizing samples elements is implemented in a memory device.

42. The machine readable medium of claim 41, wherein the memory device is a Random Access Memory.

43. The machine readable medium of claim 39, wherein the step of receiving a first signal further comprises storing the received signal in a memory.

44. The machine readable medium of claim 39, wherein the step of receiving a first signal further comprises storing the sampled elements representing said first signal in a memory.

45. The machine readable medium of claim 39, the clock cycle is generated by a second processor.

46. The machine readable medium of claim 39, each sampled elements further comprise I- and Q-phase components.

47. The machine readable medium of claim 46, wherein the I- and Q-phase components are processed simultaneously.

48. The machine readable medium of claim 46, wherein the I- and Q-phase components are processed in parallel.

49. The machine readable medium of claim 39, wherein L is equal to P+1 sampled elements.

50. The machine readable medium of claim 39, wherein L is equal to P sampled elements.

51. The machine readable medium of claim 39, further comprising the step of receiving and organizing a new first signal after P+1 clock cycles.

52. The machine readable medium of claim 39, further comprising the step of storing each cross-correlation result in a post-correlation memory.

53. The machine readable medium of claim 39, wherein the step of receiving a first signal further comprises receiving one sampled element per clock cycle.

54. The machine readable medium of claim 39, wherein the step of receiving further comprises receiving a group of samples per clock cycle.

* * * * *